United States Patent [19]

Kambara et al.

[11] Patent Number: 4,620,103

[45] Date of Patent: Oct. 28, 1986

[54] SAMPLE HOLDER FOR MASS ANALYSIS

[75] Inventors: Hideki Kambara, Hachioji; Setsuko Seki, Tokyo, both of Japan

[73] Assignee: Hitachi, Ltd., Tokyo, Japan

[21] Appl. No.: 676,923

[22] Filed: Nov. 30, 1984

[30] Foreign Application Priority Data

Dec. 2, 1983 [JP] Japan ................................ 58-226855

[51] Int. Cl.⁴ ........................ G01F 21/00; G01F 23/00

[52] U.S. Cl. .................................. 250/440.1; 250/288

[58] Field of Search ..................... 250/440.1, 309, 288, 250/423 R, 423 P

[56] References Cited

U.S. PATENT DOCUMENTS

| | | | |
|---|---|---|---|
| 4,097,738 | 6/1978 | Feve et al. | 250/305 |
| 4,178,507 | 12/1979 | Brunnée et al. | 250/423 R |
| 4,259,572 | 3/1981 | Brunnée | 250/423 R |
| 4,296,322 | 10/1981 | Wechsung | 250/423 P |
| 4,310,759 | 1/1982 | Oechsner | 250/309 |
| 4,465,935 | 8/1984 | von Criegern et al. | 250/440.1 |

*Primary Examiner*—Bruce C. Anderson
*Attorney, Agent, or Firm*—Antonelli, Terry & Wands

[57] ABSTRACT

A sample holder for mass analysis in which a sample to be irradiated by a fast particle beam is held for the measurement of secondary ions released from the sample. A matrix supporter for supporting and supplying a matrix is formed in a narrow space in a box provided in the sample holder.

3 Claims, 6 Drawing Figures

SAMPLE HOLDER FOR MASS ANALYSIS

BACKGROUND OF THE INVENTION

The present invention relates to a sample holder for mass analysis and, particularly, to a sample holder used in a secondary ion mass spectrometer for analyzing organic substances.

Determination of the molecular weight and molecular structure of various substances related to biological material is a great topic in the life and health science; theme of modern technology, and it is supported by the advancement of means for mass analyzing secondary ions produced by fast particle bombardment. In this method, a sample mixed with a large amount of matrix such as glycerol is applied to a metallic plate, and it is introduced to the ion bombardment area in a low pressure ($10^{-5}-10^{-6}$ Torr) with a direct inlet probe. The sample with matrix molecule is sputtered by the bombardment of fast ions or neutrals having energy of 5–10 keV. Through this process, part of the sputtered material is ejected as positive or negative ions, called secondary ions", which include molecular ions of the sample. The method of mass analysis for these ions is "Termed Molecular Secondary Ion Mass Spectrometry (Molecular SIMS)".

In this method, a sample mixed with a fluid matrix such as glycerol is applied to a flat metallic plate, and introduced to the ion bombardment area. Although a fluid matrix including glycerol has a low vapor pressure, it evaporates at a considerable speed in the vacuum. Therefore, when a long term measurement is carried out, the interior of the mass spectrometer is contaminated by the fluid matrix, resulting in a degraded mass resolution and lowered sensitivity.

If the quantity of the fluid matrix is reduced significantly so as to prevent the above problems, the measurement takes a long time and the repeat accuracy of the spectrum output is impaired.

The situation will be described in more detail in connection with FIGS. 1 and 2 showing the conventional sample holder and slit plate. In this case, a sample holder 1 dimensioned by 2 mm by 5 mm holds the matrix 3 on its entire surface, providing a large matrix area in contact with the gas phase. Primary ions 2 are irradiated onto part of the matrix 3, and secondary ions 5 are released from this portion. As shown in FIGS. 1 and 2, part of the secondary ions 5 goes through the slit and reaches the ion collector. In this method, however, the matrix 3 has a large area in contact with the gas phase, and therefore a large amount of glycerol vapor, causing the contamination of the spectrometer. This problem can be alleviated by making the sample holder 1 smaller (down to about 2 mm in diameter), but at the sacrifice of the amount of sample applied, and furthermore at the risk that the matrix 3 including the sample flows over the side section of the holder 1, resulting in an increased area of matrix in contact with the gas phase.

In the usual magnetic sector type mass spectrometer, secondary ions going through the slit and reaching the ion collector are those produced by sputtering in an area of about 0.5 mm by 5 mm. Namely, only a small part of sputtered ions can be used effectively. Accordingly, a sample holder with the structure providing a minimum-necessary ion bombardment area and feeding a necessary amount of matrix has been desired.

SUMMARY OF THE INVENTION

An object of the present invention is to provide a sample holder for mass analysis which reduces the contamination of mass spectrometer caused by evaporated fluid matrix.

The present invention resides characteristically in a sample holder for mass analysis for measuring secondary ions produced by the bombardment of a fast particle beam, wherein the holder is provided with a supporter for the matrix and means for supplying the matrix at a low feedrate from the supporter to the fast particle beam bombardment area. This arrangement allows the reduction in the secondary ion ejection area to the extent that the sensitivity of analysis is not impaired, thereby holding the matrix around the area, whereby evaporation of matrix can be reduced.

DESCRIPTION OF THE PREFERRED EMBODIMENT

Figure 1:
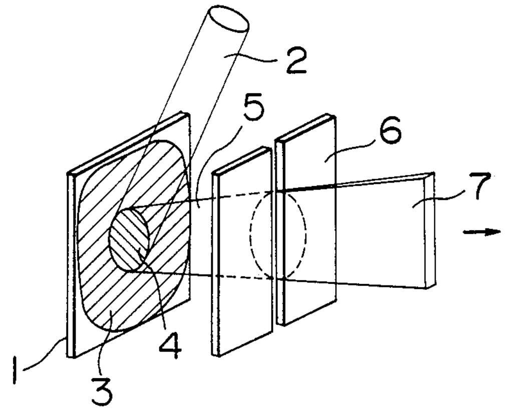
FIG. 1 PRIOR ART
FIG. 1 is an illustration of the conventionally used sample holder for mass analysis, showing the application of a sample to the planar holder.
Figure 2:
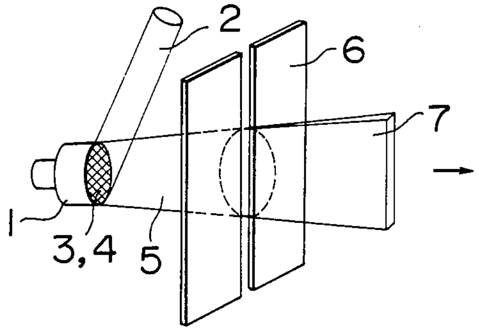
FIG. 2 PRIOR ART
FIG. 2 is an illustration of the conventionally used sample holder for mass analysis, showing the application of a sample to the holder of a smaller area.
Figure 3:
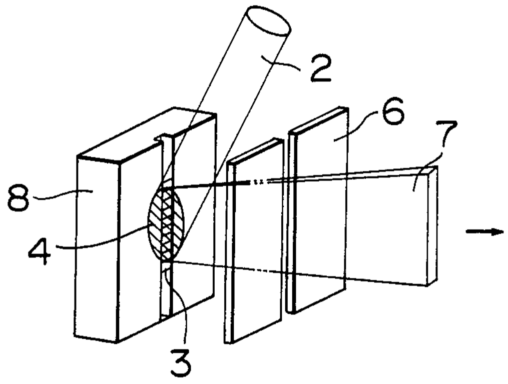
FIG. 3 is an illustration showing the sample holder for mass analysis employing the present invention.
Figure 4:
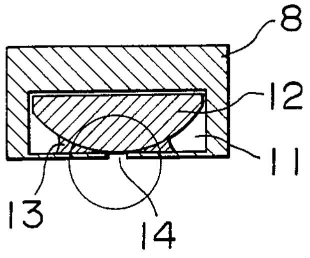
FIG. 4 is a cross-sectional view of the matrix supporter provided in the sample holder.
Figure 5:
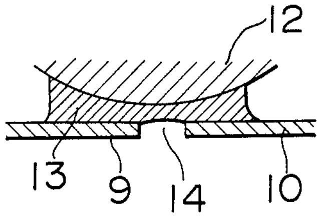
FIG. 5 is a magnified view of the matrix supporter shown in FIG. 4.

An embodiment of the present invention will now be described with reference to FIGS. 3, 4 and 5. One feature of the embodiment shown in FIG. 3 is that the entire sample holder except for the ion bombardment area including the matrix supporter is sealed so that vaporization of matrix such as glycerol is precluded. As shown by the illustration of FIG. 4 and its enlarged version of FIG. 5, a box 8 and two plates 9 and 10 which are parts of the box 8 in combination form a space 11, in which a target member 12 is placed closed to the interior wall of the box 8. A matrix supporter 13 is formed between the target member 12 and the two plates 9 and 10 by utilization of the surface tension. The gap between the target member 12 and the plates 9 and 10 becomes narrower as the position approaches a slit 14 which constitutes the ion bombardment area, and glycerol is fed into the ion bombardment area 14 by the surface tension. As a result of this structure, unnecessary vaporization of glycerol can be prevented.

In the conventional arrangement, glycerol mixed with the sample is applied to the target member and, in this case, the concentration of the sample falls, resulting in a degraded signal-to-noise ratio, when measuring a trace sample, whereas in the inventive arrangement, glycerol is first held and next the sample 4 is applied to the ion bombardment area 14 so that a high sample concentration is produced in the ion bombardment area 14, whereby only a necessary amount of glycerol can be supplied from the periphery and the sample can be used efficiently.

Figure 6:
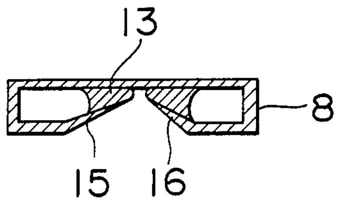
FIG. 6 is a cross-sectional view showing the modified structure of the matrix supporter.

FIG. 6 shows another embodiment of the invention, and in this case two plates 15 and 16 are bent inwardly so that the surface tension of glycerol can be used more effectively.

According to the present invention, as described above, evaporation of organic matrix such as glycerol is reduced, thereby preventing the contamination of the spectrometer and increasing the sample concentration in the ion bombardment area so that a long term measurement can be conducted.

We claim:

1. A sample holder for mass analysis of secondary ions produced by irradiation of a fast particle beam to a sample to be analyzed, said sample holder comprising:

box means for providing a space in which a fluid matrix and a sample material is held, said sample material being arranged to face toward said irradiation;

slit means with its opening allowing said space to communicate with the exterior of said box means; and means for narrowing said space at the opening of said slit means.

2. A sample holder according to claim 1 wherein said means for narrowing said space is formed by a part of said box means, said part being bent inwardly.

3. A sample holder according to claim 1, wherein said means for narrowing said space includes a target member of varying size provided inside said box means so that said space is narrowed in the vicinity of the opening of said slit means.

* * * * *